US012671165B2

(12) United States Patent
Xiong et al.

(10) Patent No.: US 12,671,165 B2
(45) Date of Patent: Jun. 30, 2026

(54) NFC READER WITH NFC ANTENNA AND WIRELESS CHARGING ANTENNA

(71) Applicant: STMICROELECTRONICS (CHINA) INVESTMENT CO., LTD., Shanghai (CN)

(72) Inventors: Tianhao Xiong, Shanghai (CN); Chaolian Liang, Shanghai (CN)

(73) Assignee: STMicroelectronics (China) Investment Co., Ltd., Shanghai (CN)

( * ) Notice: Subject to any disclaimer, the term of this patent is extended or adjusted under 35 U.S.C. 154(b) by 145 days.

(21) Appl. No.: 18/557,901

(22) PCT Filed: May 13, 2021

(86) PCT No.: PCT/CN2021/093644
§ 371 (c)(1),
(2) Date: Oct. 27, 2023

(87) PCT Pub. No.: WO2022/236777
PCT Pub. Date: Nov. 17, 2022

(65) Prior Publication Data
US 2024/0250407 A1    Jul. 25, 2024

(51) Int. Cl.
| | |
|---|---|
| *H01Q 1/22* | (2006.01) |
| *H01Q 1/38* | (2006.01) |
| *H01Q 7/00* | (2006.01) |
| *H01Q 21/28* | (2006.01) |
| *H02J 50/10* | (2016.01) |

(52) U.S. Cl.
CPC ............ *H01Q 1/2216* (2013.01); *H01Q 1/38* (2013.01); *H01Q 7/00* (2013.01); *H01Q 21/28* (2013.01); *H02J 50/10* (2016.02)

(58) Field of Classification Search
CPC ........ H01Q 1/2216; H01Q 1/38; H01Q 21/28; H01Q 7/00; H02J 50/005; H02J 50/23; H02J 50/27; H02J 50/10
See application file for complete search history.

(56) References Cited

U.S. PATENT DOCUMENTS

| | | | | |
|---|---|---|---|---|
| 11,329,511 | B2 * | 5/2022 | Partovi | ................... H02J 50/10 |
| 11,741,767 | B1 * | 8/2023 | Pearson | ............... B60R 25/406 |
| | | | | 701/2 |
| 11,951,945 | B1 * | 4/2024 | Pearson | ............ G07C 9/00309 |
| 2014/0320387 | A1 * | 10/2014 | Eriksson | ................ G06F 3/017 |
| | | | | 345/156 |
| 2015/0130979 | A1 | 5/2015 | Huang et al. | |
| 2017/0357473 | A1 * | 12/2017 | Kim | ..................... G06F 1/1681 |
| 2018/0083465 | A1 * | 3/2018 | Miller | .................. H02J 7/0045 |
| 2022/0150347 | A1 * | 5/2022 | Hulbert | .......... H04M 1/724092 |

(Continued)

FOREIGN PATENT DOCUMENTS

| | | |
|---|---|---|
| CN | 103515698 A | 1/2014 |
| CN | 103840533 A | 6/2014 |

(Continued)

*Primary Examiner* — Thien M Le

(74) *Attorney, Agent, or Firm* — Seed Intellectual Property Law Group LLP

(57) ABSTRACT

A near field communication (NFC) reader includes an NFC antenna and a wireless charging antenna. The NFC antenna substantially surrounds the wireless charging antenna laterally, except at an inward bend of the NFC antenna. The NFC antenna overlaps the wireless charging antenna at the bend.

18 Claims, 5 Drawing Sheets

(56)         References Cited

U.S. PATENT DOCUMENTS

| | | | | |
|---|---|---|---|---|
| 2022/0181911 A1* | 6/2022 | Partovi | ................ | H02J 7/0047 |
| 2023/0386245 A1* | 11/2023 | Tada | ................... | G06V 10/955 |
| 2024/0396374 A1* | 11/2024 | Chiang | .................. | B60L 53/38 |
| 2025/0167593 A1* | 5/2025 | Seth | ........................ | H02J 50/90 |

FOREIGN PATENT DOCUMENTS

| | | | |
|---|---|---|---|
| CN | 106992362 | A | 7/2017 |
| CN | 109004333 | A | 12/2018 |
| CN | 212011275 | U | 11/2020 |
| CN | 112448138 | A | 3/2021 |
| CN | 112640204 | A | 4/2021 |
| KR | 20170045601 | A | 4/2017 |
| WO | WO 2019151693 | A1 | 8/2019 |

* cited by examiner

NFC READER WITH NFC ANTENNA AND WIRELESS CHARGING ANTENNA

BACKGROUND

Technical Field

The present disclosure relates to the field of near field communication (NFC). The present disclosure relates more particularly to near field communication readers that include wireless charging capabilities.

Description of the Related Art

NFC technology utilizes radiofrequency signals to enable devices to communicate with each other in close proximity. Many applications of NFC technology utilize an NFC reader to interrogate and receive data from an NFC device. The NFC reader typically outputs an interrogation signal. If an NFC device is within range of the interrogation signal, then the NFC device responds by providing an identification signal identifying the NFC device. After the NFC device has identified itself, the NFC reader and the NFC device can further exchange information.

Some NFC readers may also include the ability to charge the battery of an NFC device by separate wireless charging circuitry. However, the presence of both NFC circuitry and wireless charging circuitry can lead to various complications that reduce the effectiveness of NFC communication.

BRIEF SUMMARY

Embodiments of the present disclosure provide an NFC reader that is able to effectively and efficiently provide both NFC communication and wireless charging capabilities. The NFC reader includes an NFC antenna and a wireless charging antenna. The NFC antenna laterally surrounds the wireless charging antenna, except at selected locations at which the NFC antenna bends inward and overlaps the wireless charging antenna. This configuration results in a very high signal strength for both NFC communication signals and wireless charging signals.

DETAILED DESCRIPTION

Figure 1:
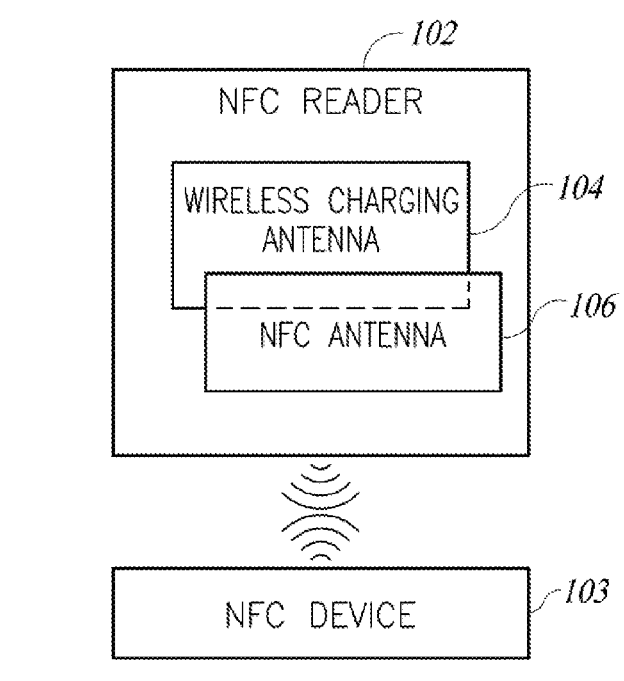
FIG. 1 is a block diagram of an NFC system, according to one embodiment.

FIG. 1 is a block diagram of an NFC system 100, according to one embodiment. The NFC system 100 includes an NFC reader 102 and an NFC device 103. The NFC reader 102 and the NFC device 103 communicate with each other utilizing NFC technology. The NFC reader 102 includes a wireless charging antenna 104 and an NFC antenna 106. As will be set forth in more detail below, the NFC antenna 106 and the wireless charging antenna 104 are arranged in an overlapping manner selected to promote high signal strength for both NFC signals and wireless charging signals.

During NFC communication, the NFC reader 102 outputs a carrier signal via the NFC antenna 106. The carrier signal is a radiofrequency signal that facilitates NFC communication. The NFC reader 102 outputs an interrogation signal by modulating the carrier signal. The interrogation signal is configured to induce a response from NFC devices 103 that are in communication range with the NFC reader 102. If an NFC device 103 is within range of the NFC reader 102, then the NFC device 103 can respond to the interrogation signal.

In one embodiment, the NFC reader 102 outputs an interrogation signal in accordance with one or more NFC protocols. The NFC protocols define the structure of an interrogation signal. The protocols can define the frequency of the interrogation signal, the type of data included in the interrogation signal, the amount of data included in the interrogation signal, and the duration of the interrogation signal. Some common NFC protocols define a standard frequency of 13.56 MHz for the carrier signal, though other standard frequencies are possible depending on NFC protocols or future updates to NFC protocols.

If the NFC device 103 operates with the same protocol as the interrogation signal, then the NFC device 103 will respond to the interrogation signal. The protocols also define the structure of the initial response of the NFC device 103 to the interrogation signal from the NFC reader 102.

The NFC device 103 may be a passive load modulation (PLM) NFC device or an active load modulation (ALM) NFC device. Passive load modulation NFC devices do not have their own power sources. Instead, PLM NFC devices are powered by the carrier signal output from the NFC reader 102. Accordingly, PLM NFC devices include energy harvesting circuitry that harvests energy from the carrier signal output by the NFC reader 102. As used herein, the term "passive NFC device" may be used interchangeably with the term "PLM NFC device".

ALM devices are powered by a power source separate from the NFC reader 102. Accordingly, when an ALM NFC device receives an interrogation signal, the ALM NFC device responds by outputting a radiofrequency signal and modulating the radiofrequency signal under the power of a power source separate from the NFC reader 102. Data is transmitted from the NFC device 103 by modulating the radiofrequency signal output by the NFC device 103. As used herein, the term "active NFC device" may be used interchangeably with the term "ALM NFC device". ALM can be achieved in other ways without departing from the scope of the present disclosure.

In some cases, the NFC reader 102 may need to determine whether the NFC device 103 is an ALM device or a PLM device in order to decide whether or not to activate a wireless charging signal. In order to make this determination, it is beneficial if the NFC reader 102 can establish strong and clear NFC communication with the NFC device 104. If NFC signals are interfered with or otherwise weakened, then the NFC reader 102 may not be able to accurately distinguish between ALM devices and PLM devices. This can be problematic, as will be set forth in more detail below.

One factor that can influence the strength and clarity of NFC communication is the placement of the NFC antenna 106 relative to the wireless charging antenna 104. The wireless charging antenna 104 and the NFC antenna 106 may be placed on the same circuit board or on different circuit boards that are separated vertically by a small distance. In either case, the relative lateral positions of the wireless charging antenna 104 and the NFC antenna 106 can affect NFC signal strength.

One possible configuration is to arrange the NFC antenna 106 so that the NFC antenna 106 laterally surrounds the wireless charging antenna 104. However, this can result in substantial attenuation of NFC signals. The attenuation can result in failure to properly establish NFC communication with an NFC device. Furthermore, in some cases, the attenuation may result in an NFC reader 102 misidentifying a PLM device for an ALM device. Such a misidentification may result in damage to a PLM device.

As used herein, the term "laterally surrounds" corresponds to lateral position of an antenna loop. The NFC antenna 106 may be said to laterally surround the wireless charging antenna 104 even though the NFC antenna 106 is vertically offset from the wireless charging antenna 104. In one example, lateral coordinates may correspond to X-Y coordinates, while vertical coordinates may correspond to Z coordinates.

In one embodiment, the NFC antenna 106 and the wireless charging antenna 104 are arranged so that the NFC antenna 106 overlaps the wireless charging antenna 104 at selected locations. The NFC antenna 106 laterally surrounds the wireless charging antenna 104 at most locations. However, as selected locations, the NFC antenna 106 bends laterally inward such that the NFC antenna 106 is positioned directly above or below the wireless charging antenna 104 at the selected locations. This overlap at selected locations results in substantially higher NFC signal strength than the NFC signal strength for some configurations in which the NFC antenna 106 laterally surrounds the wireless charging antenna 104 at all locations.

As used herein, the term "overlaps" corresponds to the NFC antenna 106 sharing the same lateral coordinates as the wireless charging antenna 104 at the selected locations. Using the example of X-Y coordinates corresponding to lateral coordinates and Z coordinates corresponding to vertical coordinates, the NFC antenna 106 overlaps the wireless charging antenna 104 when portions of the NFC antenna 106 have the same X-Y coordinates as portions of the wireless charging antenna 104, though they may be offset vertically.

In one embodiment, the wireless charging antenna 104 includes a plurality of lateral loops or windings around a central vertical axis. The NFC antenna 106 may have one or more loops or windings around the central vertical axis. The loops of the NFC antenna 106 will be further away from the central vertical axis than the loops of the wireless charging antenna 104, except at the selected locations at which the loops of the NFC antenna 106 been inward toward the central axis. At the selected locations, the loops of the NFC antenna 106 will have the same distance from the central vertical axis as do some of the loops of the wireless charging antenna 104.

The overlapping configuration of the wireless charging antenna 104 and the NFC antenna 106 results in cleaner and stronger communication between the NFC reader 102 and the NFC device 103. The NFC reader 102 may utilize various processes for determining whether the NFC device 103 is an ALM device or a PLM device. These processes may utilize strict NFC signal timing. The overlapping configuration of the wireless charging antenna 104 and the NFC antenna 106 enable clear and strong NFC communication between the NFC reader 102 and the NFC device 103. This results in the NFC reader 102 being better able to distinguish between ALM and PLM devices, as set forth in more detail below.

ALM and PLM NFC devices typically operate in accordance with particular protocols. In particular, PLM NFC devices typically operate in accordance with a different subset of NFC protocols than do ALM NFC devices. In most cases, the NFC reader 102 can accurately determine whether the NFC device 103 is an active NFC device or a passive NFC device based on the protocols with which the NFC device 103 responds to the NFC reader 102.

However, there are cases in which the NFC device 103 may operate in accordance with a protocol that does not correspond to its true nature. In some cases, the NFC device 103 may be a passive NFC device that operates in accordance with a protocol typically reserved for active NFC devices. In other cases, the NFC device 103 may be an active NFC device that operates in accordance with a protocol typically reserved for passive NFC devices. If an NFC reader does not correctly identify the type of an NFC device, it is possible that the NFC device can be damaged.

As an example, many mobile phones act as NFC devices. The mobile phones are active NFC devices. In many cases, users physically attach credit cards or ID cards their mobile phones. These credit cards and ID cards are typically passive NFC devices. The mobile phone may also include software applications that enable a credit card to be "cloned" to an NFC application of the mobile phone. Cloning the credit card corresponds to storing information related to the credit card, such as the credit card number, the expiration date, and the billing ZIP Code with the NFC application. When the mobile phone is placed within range of an NFC reader, the mobile phone communicates with the NFC reader as though the mobile phone is the credit card. Based on such an interaction, the traditional NFC reader may assume that only a passive NFC device (credit card) is present. In other cases, because credit cards or ID cards are physically coupled to a mobile phone, a traditional NFC reader may communicate with the mobile phone and may not identify the additional presence of one or more passive NFC devices.

The wireless charging antenna 104 of the NFC reader 102 has the ability to charge the battery of the NFC device 103 if the NFC device 103 is an active NFC device. In particular, the wireless charging circuitry is able to output a charging field. The active NFC device can harvest energy from the charging field. In this manner, the wireless charging circuitry can charge a battery of an active NFC device.

In one embodiment, the wireless charging circuitry operates in accordance with a Qi wireless charging standard. The Qi wireless charging circuitry outputs a charging field in a range between 50 kHz and 400 kHz. NFC signals typically communicate at a frequency of 13.56 MHz. Accordingly, the Qi charging field is outside a frequency range of NFC communication signals.

Passive NFC devices can be damaged by the charging field output by the wireless charging circuitry. If an NFC reader misidentifies a passive NFC device as an active NFC device, then it is possible that the NFC reader could cause the wireless charging circuitry to output a charging field that could damage the passive NFC device.

The NFC reader 102 is able to reliably identify whether the NFC device 103 is an active NFC device or a passive NFC device. As set forth above, in some instances it is possible that a passive NFC device could utilize a protocol typically associated with active NFC devices, or vice versa. Accordingly, after the NFC reader 102 has initially established communication with the NFC device 103, the NFC reader 102 performs a further test to determine whether the NFC device 103 is an active NFC device or a passive NFC device. Thus, the NFC reader 102 does not determine whether the NFC device 103 is an active or passive based solely on the NFC protocol with which the NFC device 103 operates.

When the NFC antenna 106 outputs an interrogation signal, the NFC antenna 106 also outputs a carrier signal. The NFC device 103 responds by providing an identification signal or another type of response signal.

The NFC reader 102 is able to selectively cause the wireless charging antenna 104 to output the charging signal based on whether or not the NFC device 103 is an ALM NFC device or a PLM NFC device. If the NFC reader 102 determines that the NFC device 103 is an ALM NFC device, then the NFC reader 102 may cause the wireless charging antenna 104 to output the charging field to charge the battery of the NFC device 103. If the NFC reader 102 determines that the NFC device 103 is a passive NFC device, then the NFC reader 102 does not cause the wireless charging circuitry to output the charging field. In this way, the NFC reader 102 will prevent the wireless charging circuitry from damaging the PLM NFC device by outputting a charging field that the passive NFC device cannot safely endure. Because of the overlapping configuration of the NFC antenna 106 and the wireless charging antenna 104, the NFC reader 102 is better able to distinguish between ALM devices and PLM.

Figure 2:
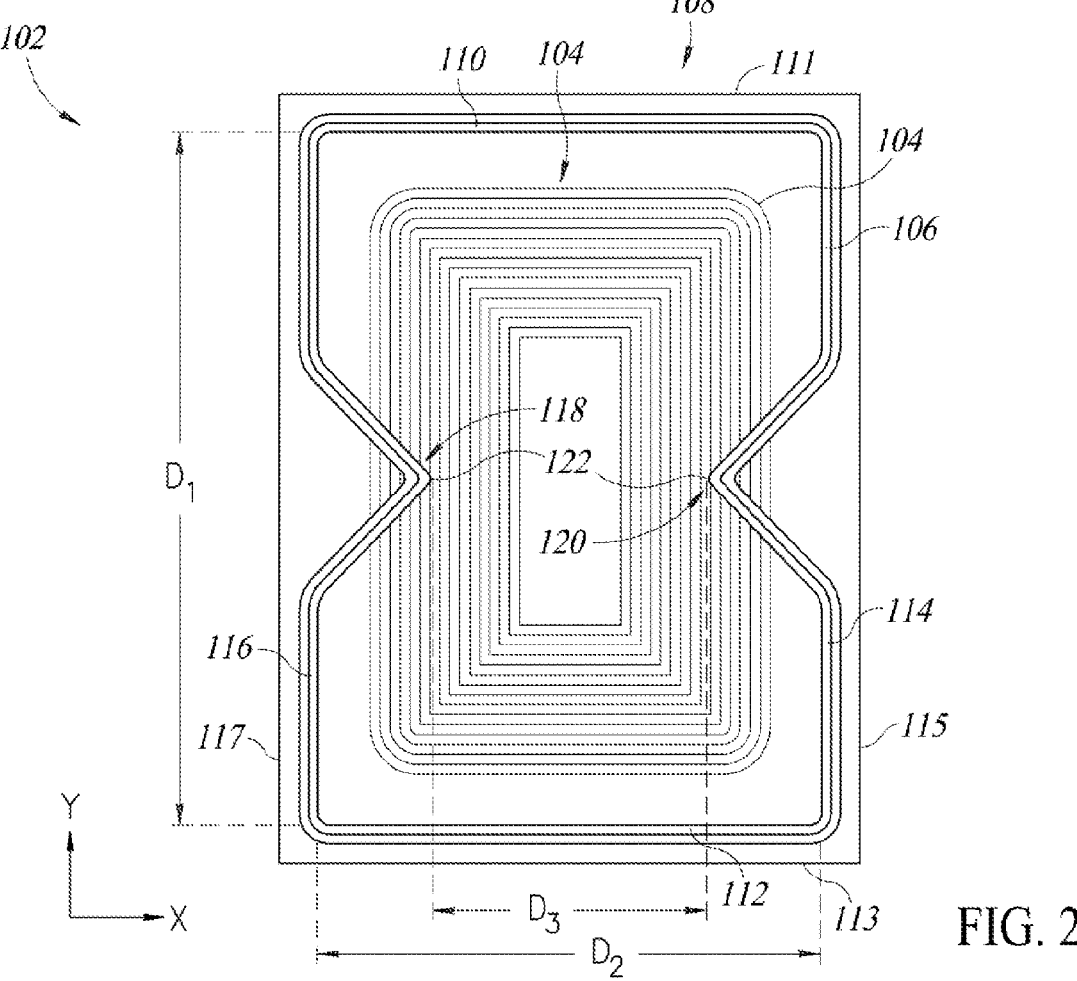
FIG. 2 is a top view of a circuit board of an NFC reader including an NFC antenna and a wireless charging antenna, according to one embodiment.

FIG. 2 is an illustration of a circuit board 108 of an NFC reader 102, according to one embodiment. The NFC reader 102 of FIG. 2 is one example of an NFC reader 102 of FIG. 1.

A wireless charging antenna 104 is positioned on the circuit board 108. The wireless charging antenna 104 includes a plurality of antenna windings or loops. The wireless charging antenna 104 may correspond to a coiled wire. The coiled wire may be covered in an insulating material to prevent short circuits. Though not shown in FIG. 2, the wireless charging antenna 104 includes leads that can be connected to terminals of the circuit board 108 so that wireless charging circuitry of an NFC device 102 can control the wireless charging antenna 104 to transmit a wireless charging signal. While FIG. 2 illustrates the wireless charging antenna 104 as multiple discrete loops, in practice the wireless charging antenna 104 includes a single segment of wire wound in multiple loops. The wireless charging antenna 104 of FIG. 2 is one example of the wireless charging antenna 104 of FIG. 1.

An NFC antenna 106 is also positioned on the circuit board 108. The NFC antenna 106 includes a plurality of antenna windings or loops. The NFC antenna 106 may correspond to a coiled wire. The coiled wire may be covered in an insulating material to prevent short circuits. Though not shown in FIG. 2, the NFC antenna 106 includes leads that can be connected to terminals of the circuit board so that NFC transceiver circuitry can control the NFC antenna 106 to transmit and receive NFC signals. While FIG. 2 shows the NFC antenna 106 as a discrete loops, in practice, the NFC antenna 106 is a single segment of wire with multiple loops. The NFC antenna 106 of FIG. 2 is one example of the NFC antenna 106 of FIG. 1.

The circuit board 108 includes a first edge 111 extending in the X direction. The circuit board 108 also includes a second edge 113 opposite the first edge and extending in the X direction. The circuit board 108 includes a third edge 115 extending in the Y direction between the first edge 111 and the second edge 113. The X direction is perpendicular to the Y direction. The circuit board 108 includes a fourth edge 117 opposite the third edge 115 and extending in the Y direction between the first edge 111 and the second edge 113. The first edge 111 extends between the third edge 115 and the fourth edge 117. The second edge 113 extends between the third edge 115 and the fourth edge 117. The circuit board 108 is rectangular, though other shapes can be utilized without departing from the scope of the present disclosure.

The NFC antenna 106 includes a first segment 110. The first segment 110 may correspond to a first segment of an innermost loop or winding of the NFC antenna 106. The first segment 110 of the NFC antenna 106 extends in the X direction adjacent to and substantially parallel with the first edge 111. The NFC antenna 106 includes a second segment 112. The second segment 112 may correspond to a second segment of an innermost loop or winding of the NFC antenna 106. The second segment 112 extends in the X direction opposite to the first segment and adjacent to and substantially parallel with the second edge 113 of the circuit board 108. The NFC antenna 106 includes a third segment 114 extending between the first segment 110 and the second segment 112. Much of the third segment 114 extends adjacent to the third edge 115 of the circuit board 108. The NFC antenna 106 includes a fourth segment 116 extending between the first segment 110 and the second segment 112. Much of the fourth segment 116 extends adjacent to the fourth edge 117 of the circuit board 108.

The third segment 114 of the NFC antenna 106 includes an inward bend 120. A portion of the third segment 114 overlaps the wireless charging antenna 104. The bend 120 extends inward toward a central vertical axis of the wireless charging antenna 104. The fourth segment 116 of the NFC antenna 106 includes an inward bend 118. A portion of the fourth segment 116 overlaps the wireless charging antenna 104. The bend 118 extends inward toward a central vertical axis of the wireless charging antenna 104.

The first bend 118 and the second bend 120 form a waist of the NFC antenna 106. The waist corresponds to a narrowing of the gap between the third segment 114 and the fourth segment 116. As used herein, "waist" refers to a narrow portion of the antenna loop. The width of the loop is smallest at the waist 122 and widens when moving away from the waist 122 in either direction. The third segment 114 and the fourth segment 116 of the NFC antenna 106 overlap the wireless charging antenna 104 at the waist 122. Said another way, the third segment 114 and the fourth segment 116 of the NFC antenna 106 overlap the wireless charging antenna at portions of the bends 118 and 120.

The NFC antenna 106 includes a first dimension D1. The first dimension D1 corresponds to the distance between the first segment 110 and the second segment 112 of the NFC antenna 106. The first dimension D1 extends in the Y direction. The first dimension D1 may correspond to the largest distance in the Y direction between points on the first segment 110 and the second segment 112. The dimension D1 may be between 7 cm and 16 cm, though other distances may be used without departing from the scope of the present disclosure.

The NFC antenna 106 includes a second dimension D2. The second dimension D2 corresponds to the largest distance in the X direction between the third segment 114 and the fourth segment 116. The dimension D2 occurs outside of the bends 118 and 120. The dimension D2 may be between 5 cm and 8 cm, though other distances may be used without departing from the scope of the present disclosure.

The NFC antenna 106 includes a third dimension D3. The third dimension D3 extends in the X direction. The third dimension D3 corresponds to the shortest distance in the X direction between points on the third segment 114 and the fourth segment 116. The third dimension D3 occurs at the waist 122. The third dimension D3 may be between 3 cm and 6 cm, though other distances may be used without departing from the scope of the present disclosure. The third dimension D3 is less than the second dimension D2.

The NFC antenna 106 substantially surrounds, laterally, the wireless charging antenna 104. For example, the lateral or X-Y coordinates of the wireless charging antenna 104 fall between the lateral or X-Y coordinates of the first segment 110, the second segment 112, the third segment 114, and the fourth segment 116, except at the bends 118 and 120. Portions of the bends 118 and 120 overlap portions of the wireless charging antenna 104. In other words, portions of the bends 118 and 120 have X-Y coordinates that are the same as portions of the wireless charging antenna 104, though the overlapping portions may be spaced apart in the vertical or Z direction (See FIG. 5).

The overlapping of the NFC antenna 106 with the wireless charging antenna 104 at selected locations results in good signal strength for NFC signals. This enables the NFC reader 102 to establish effective NFC communication with an NFC device 103.

Figure 5:
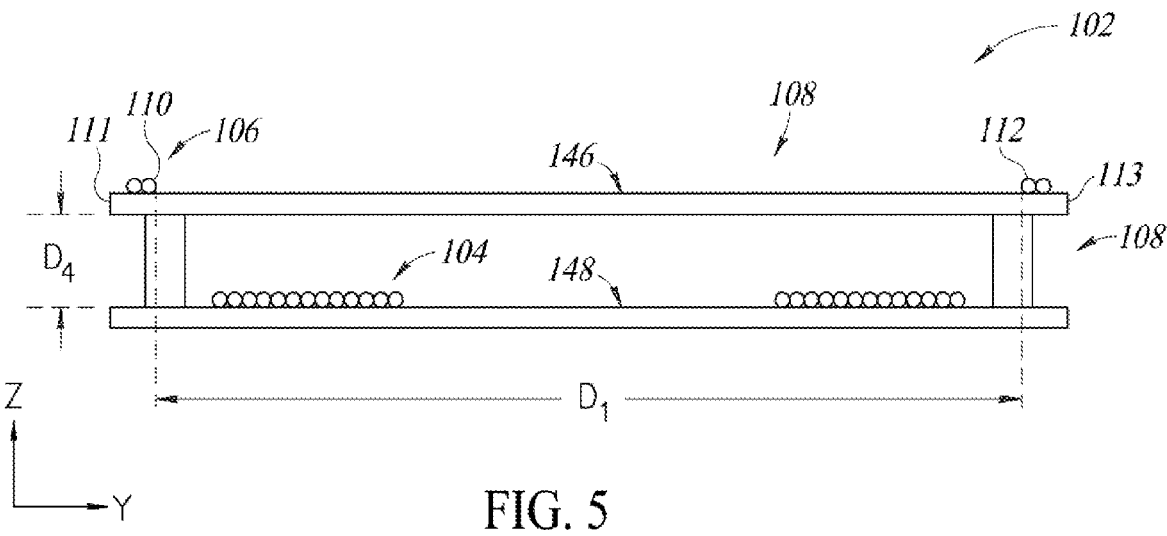
FIG. 5 is a cross-sectional view of the circuit board of FIG. 3, according to one embodiment.

Although FIG. 2 and the corresponding description indicate that the wireless charging antenna 104 and the NFC antenna 106 are on a same circuit board 108, in practice the circuit board 108 may include two portions vertically separated from each other. A portion of the circuit board 108 on which the NFC antenna 106 is positioned may be supported above a portion of the circuit board 108 on which the wireless charging antenna 108 is positioned. FIG. 5 illustrates one example of this configuration. Alternatively, the NFC antenna 106 and the wireless charging antenna 104 may be positioned on a same portion of a circuit board 108.

Figure 3:
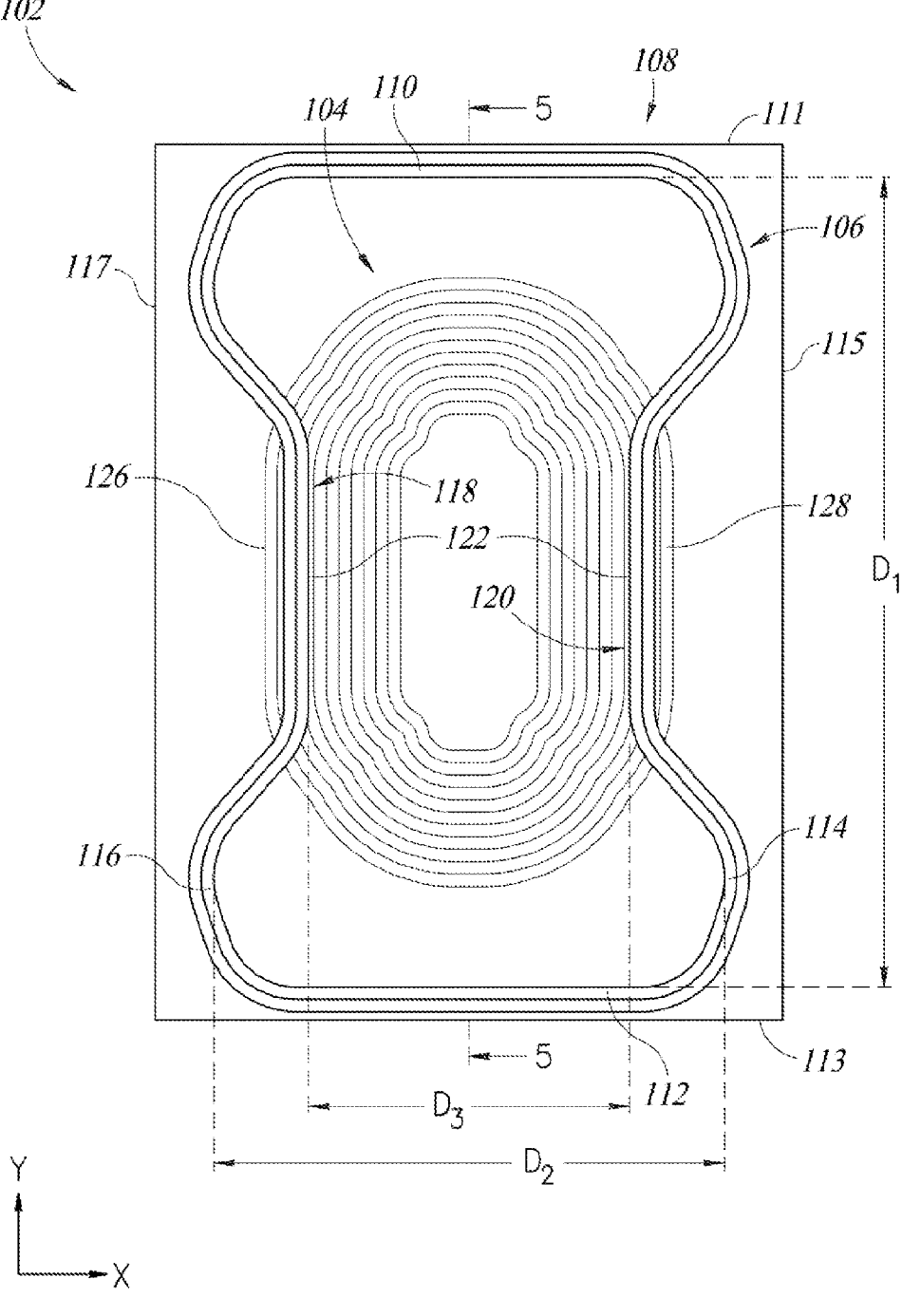
FIG. 3 is a top view of a circuit board of an NFC reader including an NFC antenna and a wireless charging antenna, according to one embodiment.

FIG. 3 is an illustration of a circuit board 108 of an NFC reader 102, according to one embodiment. The NFC reader 102 of FIG. 3 is one example of an NFC reader 102 of FIG. 1.

A wireless charging antenna 104 is positioned on the circuit board 108. The wireless charging antenna 104 includes a plurality of antenna windings or loops. The wireless charging antenna 104 may correspond to a coiled wire. The coiled wire may be covered in an insulating material to prevent short circuits. Though not shown in FIG. 3, the wireless charging antenna 104 includes leads that can be connected to terminals of the circuit board so that wireless charging circuitry of an NFC device 102 can control the wireless charging antenna 104 to transmit a wireless charging signal. While FIG. 3 illustrates the wireless charging antenna 104 as multiple discrete loops, in practice the wireless charging antenna 104 includes a single segment of wire wound in multiple loops or windings. The wireless charging antenna 104 of FIG. 3 is one example of the wireless charging antenna 104 of FIG. 1.

An NFC antenna 106 is also positioned on the circuit board 108. The NFC antenna 106 includes a plurality of antenna windings or loops. The NFC antenna 106 may correspond to a coiled wire. The coiled wire may be covered in an insulating material to prevent short circuits. Though not shown in FIG. 2, the NFC antenna 106 includes leads that can be connected to terminals of the circuit board so that NFC transceiver circuitry can control the NFC antenna 106 to transmit and receive NFC signals. While FIG. 3 shows the NFC antenna 106 as a discrete loops, in practice, the NFC antenna 106 is a single segment of wire with multiple loops. The NFC antenna 106 of FIG. 3 is one example of the NFC antenna 106 of FIG. 1.

The circuit board 108, the NFC antenna 106, and the wireless charging antenna 104 of FIG. 3 are similar to the circuit board 108, the NFC antenna 106, and the wireless charging antenna 104 of FIG. 2. The NFC antenna 106 includes a first segment 110, a second segment 112, a third segment 114, and a fourth segment 116 as described in relation to FIG. 2. The NFC antenna 106 includes bends 118 and 120 and a waist 122. The NFC antenna 106 overlaps the wireless charging antenna 104 at portions of the bends 118 and 122. The NFC antenna 106 includes dimensions D1, D2, and D3 that may be substantially as described in relation to FIG. 2.

The wireless charging antenna 104 and the NFC antenna 106 of FIG. 3 also have differences from those described in relation to FIG. 2. For example, the bends 118 and 120 have different shapes and overlap the wireless charging antenna 104 for longer extent. The waist 122 is elongated in the Y direction with respect to the waist 122 of FIG. 2. The first segment 110, the second segment 112, and the third segment 114, and the fourth segment 116 are not as straight as in FIG. 2. Additionally, the windings of the wireless charging antenna 104 having different shapes than in FIG. 2. In FIG. 2, the windings of the wireless charging antenna 104 are substantially rectangular. However, the windings of the wireless charging antenna 104 of FIG. 3 have some of a "+" shape as is most apparent when looking at the innermost winding of the wireless charging antenna 104.

Figure 4:
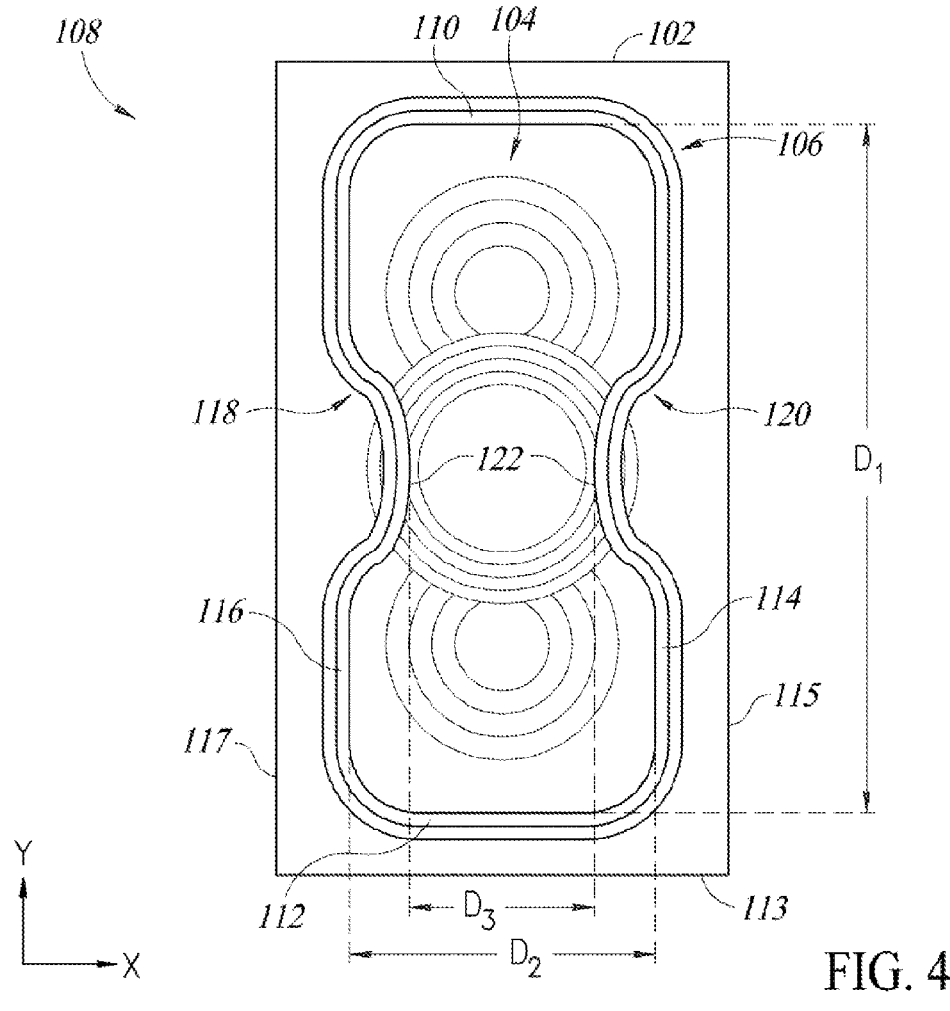
FIG. 4 is a top view of a circuit board of an NFC reader including an NFC antenna and a wireless charging antenna, according to one embodiment.

FIG. 4 is an illustration of a circuit board 108 of an NFC reader 102, according to one embodiment. The NFC reader 102 of FIG. 4 is one example of an NFC reader 102 of FIG. 1.

A wireless charging antenna 104 is positioned on the circuit board 108. The wireless charging antenna 104 includes a plurality of antenna windings or loops. The wireless charging antenna 104 includes three sets of windings or loops: an upper winding, a lower winding, and the central winding placed between and above the upper and lower windings of the wireless charging antenna 104.

An NFC antenna 106 is also positioned on the circuit board 108. The NFC antenna 106 includes a plurality of antenna windings or loops. The NFC antenna 106 may correspond to a coiled wire. The coiled wire may be covered in an insulating material to prevent short circuits. Though not shown in FIG. 2, the NFC antenna 106 includes leads that can be connected to terminals of the circuit board so that NFC transceiver circuitry can control the NFC antenna 106 to transmit and receive NFC signals. While FIG. 4 shows the NFC antenna 106 as a discrete loops, in practice, the NFC antenna 106 is a single segment of wire with multiple loops. The NFC antenna 106 of FIG. 4 is one example of the NFC antenna 106 of FIG. 1.

The circuit board 108, the NFC antenna 106, and the wireless charging antenna 104 of FIG. 3 are similar to the circuit board 108, the NFC antenna 106, and the wireless charging antenna 104 of FIG. 2. The NFC antenna 106 includes a first segment 110, a second segment 112, a third segment 114, and a fourth segment 116 as described in relation to FIG. 2. The NFC antenna 106 includes bends 118 and 120 and a waist 122. The NFC antenna 106 overlaps the wireless charging antenna 104 at portions of the bends 118 and 122. The NFC antenna 106 includes dimensions D1, D2, and D3 that may be substantially as described in relation to FIG. 2.

The wireless charging antenna 104 and the NFC antenna 106 of FIG. 4 also have differences from those described in relation to FIG. 2. For example, the bends 118 and 120 have different shapes. The bends 118 and 120 and the waist 122 only overlap the central coil of the wireless charging antenna 104. Additionally, the windings of the wireless charging antenna 104 having different shapes than in FIG. 2. In FIG. 2, the windings of the wireless charging antenna 104 are substantially rectangular. However, the windings of the wireless charging antenna 104 of FIG. 4 are substantially circular.

FIG. 5 is a cross-sectional view of the circuit board 108 of FIG. 3, according to one embodiment. The cross-sectional view is taken along cut lines 5 of FIG. 3. The circuit board includes an upper circuit board portion 146 and the lower circuit board portion 148. The upper circuit board portion 146 is separated from the lower circuit board portion 148 in the vertical or Z direction. The wireless charging antenna 104 is positioned on the lower circuit board portion 148. The NFC antenna 106 is positioned on the upper circuit board portion 146. The portions of the NFC antenna 106 that overlaps the wireless charging antenna 104 are not visible in the view of FIG. 5 due to the position of the cut lines.

The upper circuit board portion 146 is spaced apart from the lower circuit board portion 148 by a dimension D4. The dimension D4 extends in the Z direction mutually perpendicular to the X direction and the Y direction. The dimension D4 may be between 0.5 mm and 15 mm, though other distances can be utilized without departing from the scope of the present disclosure. The upper circuit board portion 146 and the lower circuit board portion 148 may have identical dimensions. Alternatively, the upper circuit board portion 146 and the lower circuit board portion 148 may have different dimensions from each other. Support posts may support the upper circuit board portion 146 and above the lower circuit board portion 148.

While FIG. 5 illustrates the NFC antenna 106 on the upper circuit board portion 146 and the wireless charging antenna 104 is on the lower circuit board portion 148, the NFC antenna 106 may be on the lower circuit board portion 148 and the wireless charging antenna 104 may be on the upper circuit board portion 146.

Figure 6:
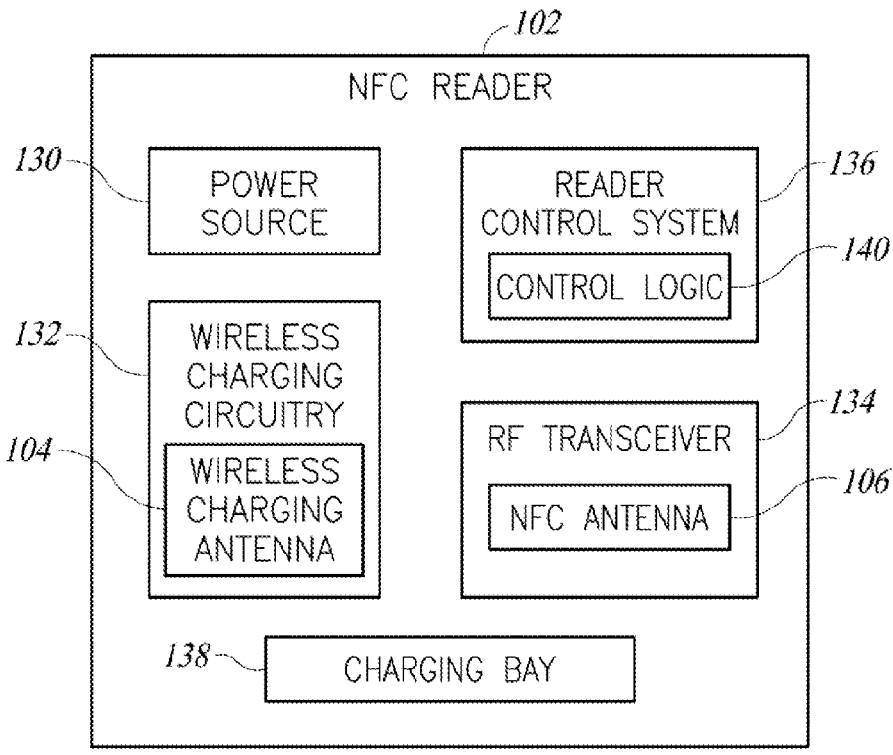
FIG. 6 is a block diagram of an NFC reader, according to one embodiment.

FIG. 6 is a block diagram of an NFC reader 102, according to one embodiment. The NFC reader 102 includes an RF transceiver 134, a reader control system 136, a power source 130, a charging bay 138, and wireless charging circuitry 132. The reader control system 136 includes control logic 140. The components of the NFC reader 102 to cooperate together to provide NFC communication and separate wireless charging.

The RF transceiver 134 enables the NFC reader 102 to transmit signals and to receive signals. The RF transceiver 134 can include the NFC antenna 106 for transmitting NFC signals and for receiving NFC signals. The RF transceiver 134 can include additional circuitry for enabling the RF transceiver 134 to transmit signals including interrogation signals, carrier signals, and other types of signals. The RF transceiver 134 can include additional circuitry for enabling the RF transceiver 134 to receive and process signals including interrogation signals and other types of signals from an NFC device 103.

The reader control system 136 includes control circuitry for controlling the function of the NFC reader 102. The reader control system 136 controls the operation of the RF transceiver 134. The reader control system 136 controls the transmission of signals with the RF transceiver 134. The reader control system 136 also controls the reception of signals with the RF transceiver 134. The reader control system 136 can include processing resources, memory resources, and data transmission resources.

The control system 136 includes the control logic 140. The control logic 140 can include instructions for operation of the control system 136. The control logic 140 can include instructions protocols for performing the operations, processes, and methods executed by the NFC reader 102, including those described herein. The control logic 140 can correspond to software instructions stored in a memory of the NFC reader 102.

The power source 130 provides power to the NFC reader 102. The power source 130 can include one or more of an internal battery, a wired power connection to an external power source, and a wireless power connection to an external power source.

The wireless charging circuitry 132 selectively provides a wireless charging field based on the types of NFC devices that are present as determined by the NFC reader 102. The wireless charging circuitry 132 includes a wireless charging antenna 104 that may not operate in accordance with NFC communication frequencies and protocols. Thus, the NFC reader 102 may be a device that includes both NFC communication circuitry and separate wireless charging circuitry.

In one embodiment, the wireless charging circuitry 132 operates in accordance with a Qi wireless charging standard. The Qi wireless charging circuitry outputs a charging field in a range between 50 kHz and 400 kHz. NFC signals typically communicate at a frequency of 13.56 MHz. Accordingly, the Qi charging field is outside a range of NFC communication signals. The wireless charging circuitry 132 may also operate in accordance with charging protocols or standards other than Qi without departing from the scope of the present disclosure.

The wireless charging circuitry 132 of the NFC reader 102 can be controlled by its own control logic, by the control logic 140 of the reader control system 136, or by other control systems. The wireless charging circuitry selectively outputs the wireless charging field based on the types of NFC devices present as detected by the reader control system 136.

The charging bay 138 includes a physical area on which an NFC device 103 can be positioned in order to receive wireless charging signals from the NFC reader 102. When an ALM NFC device 103 is positioned on the charging bay 138, the NFC reader 102 detects that the NFC device 103 is an ALM NFC device and causes the wireless charging circuitry 132 to begin outputting the wireless charging field.

Figure 7:
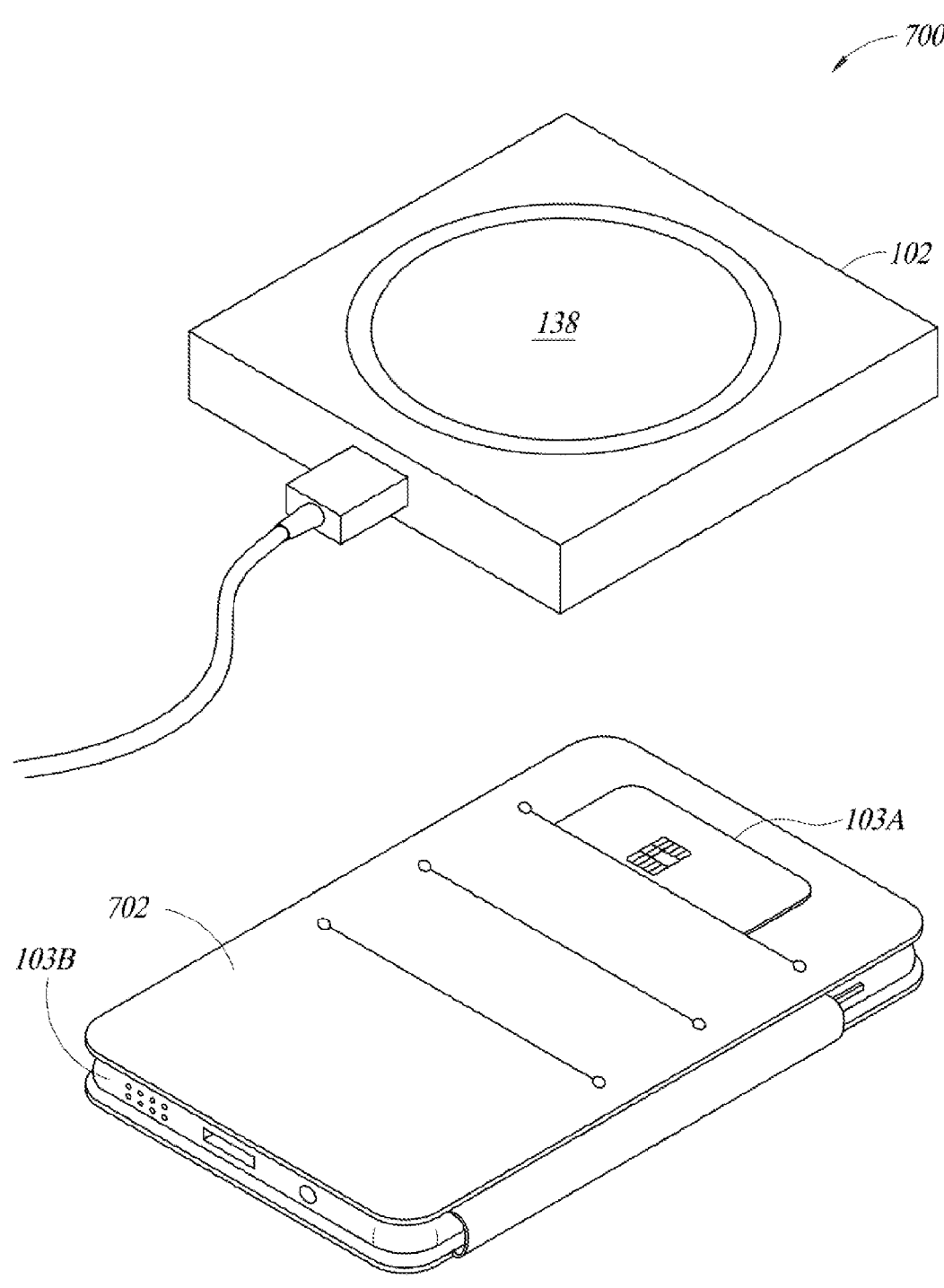
FIG. 7 is an illustration of an NFC system, according to one embodiment.

FIG. 7 is an illustration of an NFC communication system 700, according to one embodiment. The NFC communication system 700 includes an NFC reader 102, a PLM NFC device 103A and an active NFC device 103B. The NFC reader 102 communicates with the active NFC device 103B and the passive NFC device 103A.

In the example of FIG. 7, the active NFC device 103B is a smart phone with active NFC circuitry. In the example of FIG. 7, the passive NFC device 103A is a credit card with passive NFC circuitry. The smart phone includes a protective case 702. The protective case 702 includes several slots for holding cards of various types. The credit card is positioned in one of the slots of the protective case 702. This is a common configuration that enables people to carry their identification and credit cards with their smart phone.

The NFC reader 102 includes a charging bay 138. A user can place the smart phone 103B on the charging bay. The NFC reader 102 can communicate with the smart phone 104 via NFC protocols. The NFC reader 102 can charge the battery of the smart phone when the smart phone is positioned on the charging bay 138.

Because the credit card 103A is a passive NFC device including passive NFC circuitry, it is possible that a fully powered charging field could damage the NFC circuitry of the credit card 103A. Thus, when the credit card 103A is positioned in the protective case 702 of the smart phone 103B and the smart phone 103B is positioned on the charging bay 138, it is possible that a fully powered charging field could damage the NFC circuitry of the credit card 103A.

When the smart phone 103B is positioned on the charging bay 138, the NFC reader 102 outputs interrogation signals and listens for responses on the various NFC protocols. In this way, the NFC reader 102 establishes communication with both the smart phone 103B and the credit card 103A.

FIG. 7 illustrates an embodiment in which an active NFC device is a smart phone and a passive NFC device is an NFC enabled credit card. However, other types of active and passive NFC devices can be utilized without departing from the scope of the present disclosure.

In one embodiment, a device includes a wireless charging antenna and a near field communication antenna including an antenna loop. The antenna loop has a first dimension along a first direction, a second dimension along a second direction perpendicular to the first direction, and a third dimension along the second direction, wherein the third dimension is smaller than the second dimension. The antenna loop is positioned over the wireless charging antenna at the second dimension.

In one embodiment, a device includes a wireless charging antenna and a near field communication antenna including an antenna loop having a waist. The antenna loop overlaps the wireless charging antenna at the waist.

In one embodiment, a near field communication reader includes a circuit board, a wireless charging antenna on the circuit board, and a near field communication antenna on the circuit board and including an antenna loop. The antenna loop has a first segment, a second segment opposite the first segment, a third segment extending between the first segment and the second segment and including a first bend toward a center of the wireless charging antenna, and a fourth segment opposite the third segment, extending between the first segment and the second segment, and including a second bend toward the center of the wireless charging antenna. The first and second bends overlap the wireless charging antenna.

In one embodiment, a method includes placing a wireless charging antenna on a circuit board and placing a near field communication antenna on the circuit board. The near field communication antenna is positioned laterally outside the wireless charging antenna except at a waist region of the of the near field communication antenna.

In one embodiment, a method includes attaching a wireless charging antenna to a circuit board and attaching a near field communication antenna to the circuit board, the near field communication antenna including an antenna loop. The antenna loop includes a first dimension along a first direction, a second dimension along a second direction perpendicular to the first direction, and a third dimension along the second direction, wherein the third dimension is smaller than the second dimension. The antenna loop is positioned over the wireless charging antenna at the second dimension.

In one embodiment, a method includes charging a battery of an near field communication device via a wireless charging antenna of a near field communication reader and establishing near field communication between the near field communication reader and the near field communication device via a near field communication antenna of the near field communication reader. The near field communication antenna includes an antenna loop laterally surrounding wireless charging antenna except at a waist region of the antenna loop.

In one embodiment, a method includes charging a battery of an near field communication device via a wireless charging antenna of a near field communication reader and establishing near field communication between the near field communication reader and the near field communication device via a near field communication antenna of the near field communication reader. The near field communication antenna includes an antenna loop. The antenna loop includes a first dimension along a first direction, a second dimension along a second direction perpendicular to the first direction, and a third dimension along the second direction, wherein the third dimension is smaller than the second dimension. The antenna loop is positioned over the wireless charging antenna at the second dimension.

In one embodiment, a method includes charging a battery of an near field communication device via a wireless charging antenna of a near field communication reader and establishing near field communication between the near field communication reader and the near field communication device via a near field communication antenna of the near field communication reader. The near field communication antenna including an antenna loop has a first segment, a second segment opposite the first segment, a third segment extending between the first segment and the second segment and including a first bend toward a center of the wireless charging antenna, and a fourth segment opposite the third segment, extending between the first segment and the second segment, and including a second bend toward a center of the wireless charging antenna. The first and second bends overlap the wireless charging antenna.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A device, comprising:
a wireless charging antenna; and
a near field communication antenna including an antenna loop having:
a first dimension along a first direction;
a second dimension along a second direction perpendicular to the first direction; and
a third dimension along the second direction, wherein the third dimension is smaller than the second dimension, wherein the antenna loop is positioned over the wireless charging antenna at the third dimension;
control circuitry configured to control operation of the wireless charging antenna and the near field communication antenna and to drive the wireless charging antenna at a first frequency and to drive the near field communication antenna at a second frequency at least 50 times greater than the first frequency.

2. The device of claim 1, wherein the control circuitry is configured to operate the wireless charging antenna with a Qi protocol.

3. The device of claim 1, wherein the second dimension is at least 1 cm larger than the third dimension.

4. The device of claim 3, wherein the third dimension is between 3 cm and 6 cm.

5. The device of claim 4, wherein the second dimension is between 5 cm and 8 cm.

6. The device of claim 4, wherein the first dimension is between 7 cm and 16 cm.

7. The device of claim 3, wherein the near field communication antenna is not positioned over the wireless charging antenna at locations corresponding to the second dimension.

8. A device comprising:
a wireless charging antenna; and
a near field communication antenna including an antenna loop having a waist, wherein the antenna loop overlaps the wireless charging antenna at the waist, wherein the antenna loop includes:
a first segment;
a second segment opposite the first segment;
a third segment connecting the first and second segments; and
a fourth segment opposite the third segment and connecting the first and second segments, wherein the waist is in the third and fourth segments.

9. The device of claim 8, wherein the antenna loop does not overlap the wireless charging antenna outside the waist.

10. The device of claim 8, further comprising a circuit board, wherein the wireless charging antenna and the near field communication antenna are positioned on the circuit board.

11. The device of claim 8, further comprising:
a first circuit board portion; and
a second circuit board portion above the first circuit board portion, wherein the wireless charging antenna is on the second circuit board portion and the near field communication antenna is on the first circuit board portion.

12. The device of claim 8, further comprising:
a first circuit board portion; and
a second circuit board portion below the first circuit board portion, wherein the wireless charging antenna is on the second circuit board portion and the near field communication antenna is on the first circuit board portion.

13. The device of claim 8, wherein the first and second segments do not overlap the wireless charging antenna.

14. The device of claim 13, wherein the third and fourth segments are separated by a first distance in a first direction outside the waist and by a second distance less than the first distance in the first direction at the waist.

15. The device of claim 13, wherein the first and second segments are separated by a third distance in a second direction perpendicular to the first direction, wherein the third distance is greater than the first distance.

16. A near field communication reader, comprising:
a circuit board;
a wireless charging antenna on the circuit board; and
a near field communication antenna on the circuit board and including an antenna loop having:
a first segment;
a second segment opposite the first segment;
a third segment extending between the first segment and the second segment and including a first bend toward a center of the wireless charging antenna; and
a fourth segment opposite the third segment, extending between the first segment and the second segment, and including a second bend toward the center of the wireless charging antenna, wherein the first and second bends overlap the wireless charging antenna.

17. The near field communication reader of claim 16, wherein the wireless charging antenna is positioned between the first segment and the second segment.

18. The near field communication reader of claim 16, wherein the first segment and the second segment do not overlap the wireless charging antenna.

* * * * *